H. HARKINS.
PISTON RING.
APPLICATION FILED JUNE 5, 1908.
920,950.
Patented May 11, 1909.
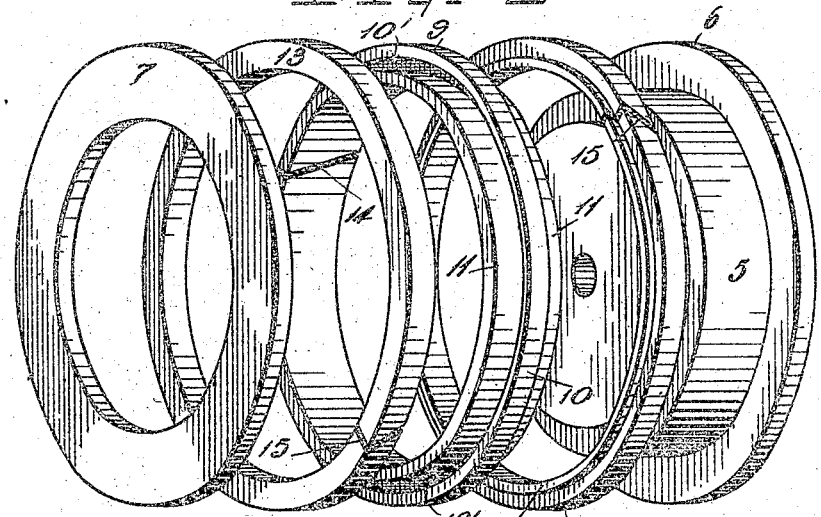
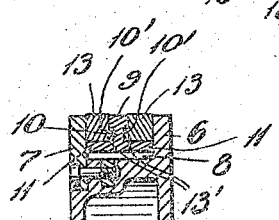
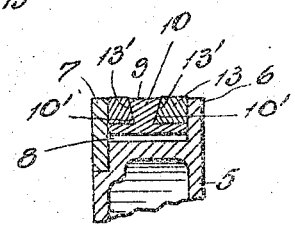
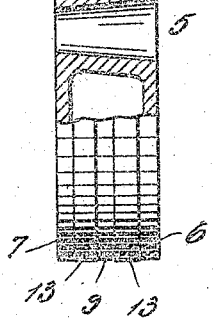
WITNESSES:
INVENTOR.
Harry Harkins
BY
ATTORNEY.

UNITED STATES PATENT OFFICE.

HARRY HARKINS, OF SEATTLE, WASHINGTON.

PISTON-RING.

No. 920,950.

Specification of Letters Patent.

Patented May 11, 1909.

Application filed June 5, 1908. Serial No. 436,830.

*To all whom it may concern:*

Be it known that I, HARRY HARKINS, a citizen of the United States, residing at Seattle, in the county of King and State of Washington, have invented certain new and useful Improvements in Piston-Rings, of which the following is a specification.

This invention relates to pistons and, while it may advantageously be employed in a number of useful services, is particularly valuable in engines operating under a high pressure of steam.

As is understood by those familiar with the subject, great difficulty is attendant upon the practice hitherto in use of employing spring metal or spring pressed rings in pistons to pack the latter, from the fact that such rings cannot be made to bear, throughout their circumferences, uniformly against the cylinder bore, and consequently wear away the surface of the latter unevenly, or "out of true"; from which a leakage of steam ensues together with a direct loss of power due to an increasing amount of friction.

Various devices have been employed in endeavors to overcome the troubles above alluded to, notably, by utilizing the pressure of the power medium to expansively press auxiliary, or packing, rings against the cylinder; and while such expedients may serve to make a practically non-leakable packing between the piston and cylinder, and for an unlimited time, it does so by aggravating the aforesaid other troubles.

It is the object of this invention to obviate the above alluded to and other imperfections common to engine-pistons without otherwise impairing the efficiency thereof.

To this end the invention consists in the novel construction, adaptation and combination of devices, as will be described hereinafter and more particularly pointed out in the appended claims.

In the accompanying drawings, Figure 1 is a side elevation, partly in section, of an engine-piston embodying my invention; Fig. 2 is a perspective view of the parts shown in Fig. 1 in a separated condition; and Fig. 3 is a fragmentary sectional view of a modified form of the invention.

The reference numeral 5 designates a piston-head provided with peripheral marginal flanges 6 and 7 so as to afford a circumferential groove 8 therebetween. For the purposes of this invention the flange 7 is detachable and corresponds to the following-ring commonly employed in two-part piston heads. The aforesaid groove is rectangular in cross-section, with a circular bottom surface 8' and two end surfaces 8" which are respectively disposed in planes perpendicular to the piston axis. Provided for this groove is a piston-ring 9 having a centrally disposed web 10 and two laterally projecting flanges 11 of an extreme width such as to extend from the piston flanges 6 to 7. Seated within each of the angles formed by the web 10 with the respective flanges 11 are packing-rings 13 which are formed to occupy the spaces between the ring-web and the piston-flanges. The packing rings are arranged to make locked engagement with the ring 10, and accordingly the opposite sides of the web are undercut as at 10' to accommodate projecting portions 13' of the respective packing rings. This construction may be attained by forming the web of a substantially T-shape, as in Figs. 1 and 2, or with a dove-tail configuration, as represented in Fig. 3, with the packing-rings correspondingly formed to make interfitting connections between the rings 10 and 13.

In carrying out my invention, the ring 10 is desirably of iron and cast to a size slightly greater in length and diameter than the corresponding respective dimensions of the piston groove and the bore of the cylinder, and is then turned down to the length of the groove and slotted, as at 14, to remove sufficient metal therefrom to allow the ends thus provided being drawn toward each other for imparting the requisite elasticity to the ring and be of slightly less diameter than the cylinder bore.

The rings 13 may be made of any suitable material and are likewise cast to greater dimensions than the spaces which they are to occupy and are then machined to size and slotted, as at 15, to allow of their being entered into the cylinder bore and to interfit with the ring web 10. A spring or springs may be interposed between the ring 9 and the bottom of the groove 8, or dependence may be had upon the elasticity of the ring to maintain the rings 13 in operative contact with the cylinder bore.

The advantages of this invention reside principally in the distribution of the outward force upon the packing rings necessary to cause the same to properly bear against the interior of a cylinder, and which is accomplished by locking the piston rings with the controlling ring, both as to any radial contracting or expanding movements, while permitting unobstructed corresponding movements with respect to the piston head.

Having described my invention, what I claim as new and desire to secure by Letters-Patent, is—

1. The combination with a piston-head provided with a peripheral groove, a resilient piston ring seated in said groove and occupying the entire width thereof, and said ring, of means comprising packing rings for locking said ring in position and restraining the same from pressing against the bore of a containing cylinder, substantially as described.

2. The combination with a piston-head provided with a peripheral groove having the opposing faces of its flanges respectively arranged in planes perpendicular to the axis of the head, of a resilient piston ring positioned in said groove, and packing rings extending around the piston and protruding into recesses in the piston ring whereby the latter is reliably held in operative position, substantially as described.

3. The combination of a piston-head provided with a peripheral groove, a resilient piston ring having a web which is substantially T-shape in cross section, and a packing ring for each of the cavities formed by the adjacent flanges of the piston-head and the recesses of the piston-ring web, substantially as and for the purposes described.

4. The combination with a piston-head having a peripheral groove intermediate two marginal flanges whose inner faces are perpendicular to the axis of the head, of a resilient piston ring of a width to fit between said flanges, said ring being provided with a web having a recessed face, and a packing ring having opposite faces arranged to correspond respectively with said recessed face of the packing ring and the perpendicular face of the opposing of said flanges.

Signed this 22nd of May 1908, in the presence of two witnesses.

HARRY HARKINS.

In the presence of—
HORACE BARNES.
A. B. SMITH.